United States Patent
Rigollet et al.

(10) Patent No.: US 11,313,500 B2
(45) Date of Patent: Apr. 26, 2022

(54) TIGHTENING DEVICE COMPRISING A BELT AND A SEALING RING

(71) Applicant: CAILLAU, Issy les Moulineaux (FR)

(72) Inventors: Nicolas Rigollet, Romorantin-Lanthenay (FR); Abdelfettah Zinbi, Romorantin-Lanthenay (FR)

(73) Assignee: Caillau, Issy les Moulineaux (FR)

( * ) Notice: Subject to any disclaimer, the term of this patent is extended or adjusted under 35 U.S.C. 154(b) by 195 days.

(21) Appl. No.: 16/711,801

(22) Filed: Dec. 12, 2019

(65) Prior Publication Data
US 2020/0191305 A1    Jun. 18, 2020

(30) Foreign Application Priority Data

Dec. 17, 2018  (FR) ...................................... 1873094

(51) Int. Cl.
*F16L 23/18* (2006.01)
*F16L 23/08* (2006.01)

(52) U.S. Cl.
CPC ............... *F16L 23/18* (2013.01); *F16L 23/08* (2013.01)

(58) Field of Classification Search
CPC . F16L 23/04; F16L 23/08; F16L 23/16; F16L 23/162; F16L 23/18; F16L 23/20; F16L 23/22; F16L 17/00; F16L 17/02; F16L 17/04; F16L 21/06

USPC ........ 285/368, 337, 365, 366, 367, 373, 410
See application file for complete search history.

(56) References Cited

U.S. PATENT DOCUMENTS

| 2003/0015872 | A1  | 1/2003  | Potts et al. |
| 2011/0210546 | A1* | 9/2011  | Geese ................... F16L 21/005 285/337 |
| 2014/0306449 | A1  | 10/2014 | Prevot et al. |

FOREIGN PATENT DOCUMENTS

WO    WO 2004/085901 A1    10/2004

OTHER PUBLICATIONS

French Search Report (2 pages) dated Sep. 12, 2019 for FR Application No. 1873094.

* cited by examiner

*Primary Examiner* — Aaron M Dunwoody
(74) *Attorney, Agent, or Firm* — Fay Sharpe LLP

(57) ABSTRACT

A belt has a sealing ring disposed in an annular recess of the belt and two tightening lugs born by the ends of the belt. The edges of the recess form wedging steps for the edges of the sealing ring which substantially occupy the entire width of the recess. The ends of the belt exhibit a sealing arrangement which includes lateral tabs, that are formed at the second end and which extend widthwise on the belt, from one edge of the belt to the recess such that each lateral tab includes a part of one of the wedging steps.

17 Claims, 11 Drawing Sheets

TIGHTENING DEVICE COMPRISING A BELT AND A SEALING RING

This application claims priority from French Patent Application No. 1873094, filed on Dec. 17, 2018, and is incorporated herein by reference in its entirety.

TECHNICAL FIELD

The present disclosure relates to a tightening device comprising a belt having a first and a second end, a sealing ring disposed inside the belt, and a first and second tightening lugs born by the belt, respectively in the vicinity of the first and second end thereof, the lugs being capable of being displaced with respect to each other to tighten the belt.

Particularly, such a device serves to sealingly connect two tubes. The latter can consist of two smooth tubes arranged end-to-end, the sealing ring thus cooperating with the parting line between the ends of the tubes or two tubes press-fitted into each other and having bearing surfaces of bulging type or similar, in whichever case the sealing ring can cooperate with the summits of these bulges to arrange a closed sealed space between them.

PRIOR ART

Document US 2011/210546 discloses a device comprising an outer tightening belt provided with tightening lugs, an inner belt disposed inside the outer belt and a sealing ring disposed in a recess of the inner belt. The outer belt ensures the tightening, whereas combining the sealing ring and the inner belt ensures sealing. The ends of the inner belt having tab and notch configurations, the tabs penetrating in the notches to ensure a sealing contact during the tightening of the outer belt. This system is relatively complex, as it implies handling and assembling the three different pieces constituting the outer belt, the inner belt and the sealing ring, and these pieces should be positioned perfectly and wedged against each other.

Document US 2003/015872 proposes a device comprising, in one of its alternatives, a belt, lugs fastened to this belt, and a sealing ring disposed inside the belt. This system is simpler as it does not require a tightening belt in addition to the belt that contains the sealing ring. However, the wedging of the sealing ring inside the belt is random, and the sealing of the contact between the ends of the belt is not satisfactory.

SUMMARY OF THE INVENTION

The present disclosure aims to improve the aforementioned state of the art by proposing a device substantially exempt from the aforementioned drawbacks, particularly a device that is easy to use and reliable. Thus, the present disclosure relates to a tightening device comprising a belt having a first and a second end, a sealing ring disposed in an annular recess of the belt, and a first and a second tightening lug born by the belt, respectively in the vicinity of its first and its second end, the lugs being able to be displaced with respect to each other to tighten the belt, the recess having edges that form wedging steps for the edges of the sealing ring, the latter substantially occupying the entire width of the recess between said steps, the first and second ends of the belt having a sealing arrangement which comprises two lateral tabs formed at the second end, each of these lateral tabs extending, widthwise on the belt, from one edge of the belt to the recess, in such a way that each lateral tab comprises a part of one of the wedging steps.

Thus, the sealing ring is received in the annular recess of the belt and, in as far as it substantially occupies the entire width of this recess, it is wedged between the steps that delimit this recess. This wedging remains effective at the junction between the first and the second end of the belt since the sealing belt is maintained thereto laterally by the parts of the steps comprised by the lateral tabs. The sealing arrangement is directly achieved on the ends of the belt, integral with it, thereby ensuring a sealing contact between these ends in the tightened state of the belt. However, the sealing ring disposed inside the belt is hardly exposed on the outside, its edges being protected by the lateral tabs which receive it in their step portions.

The sealing arrangement is particularly a male/female arrangement type, the first end of the belt presenting a male arrangement that penetrates between the lateral tabs of the second end in the tightened state of the belt. A cooperation between this male arrangement and the inner edges of the lateral tabs, that is to say, the edges of these tabs that are opposite to the annular edges of the belt promote the sealing property. Optionally, the sealing arrangement comprises a central tab formed at the first end of the belt and a central notch formed at the second end of the belt and delimited by the lateral tabs, the central tab penetrating in the central notch in the tightened state of the belt.

Optionally, the recess has a flat bottom that extends from one wedging step to the other.

Optionally, the tightening lugs are formed in strip portions brought onto on the belt.

Optionally, the strip portions in which the tightening lugs are formed, have a width lower than or equal to the width of the recess and are fastened on the radially external face of the recess.

Optionally, the strip portion in which the first lug is formed is fastened to the belt in at least one first fastening area which is located on the central tab.

Optionally, the strip portion in which the first lug is formed is further fastened to the belt in at least a second fastening area which, in the tightened state of the belt, extends beyond the ends of the lateral tabs in the direction going from the first end towards the second end of the belt, following the circumference of the belt.

Optionally, the width of the recess represents at least 60%, preferably at least 70% or even 80% of the belt width.

Optionally, the minimum width of the central tab represents at least 50%, preferably at least 60% or even 70% of the belt width.

Optionally, the length of the lateral tabs ranges between 50% and 150%, optionally between 70% and 120%, of the belt width.

Optionally, the device comprises two first tightening lugs disposed in the vicinity of the first end of the belt on two distinct portions of the belt width, and two tightening lugs disposed in the vicinity of the second end of the belt on two portions of the belt width.

Optionally, the distinct portions of the belt width on which the two first lugs and/or the two second lugs are disposed, are separated by a circumferential slit of the belt.

Optionally, the device comprises a tightening stem, retained with respect to the two lugs.

In the device according to the present disclosure, the sealing ring occupies the recess volume and is wedged on its edges by the steps that delimit this recess. The tightening lugs can be directly integrated with the belt or be formed by strip portions that are added on. Thus, the belt can be in a material that deforms more easily than the tightening lugs. Particularly, the tightening lugs and the belt can be achieved in metal strips, that in which the lugs are achieved can be mechanically more resistant, for example by having a greater thickness. This being said, depending on the applications, the belt can on the other hand be achieved in a thicker strip, particularly when the tightening lugs are shaped to have reinforcements that oppose to their tilting during tightening. The reinforcement can occupy a significant proportion of the belt width, thereby allowing the sealing ring to have a substantial width, favourable to sealing in some configurations, particularly when the sealing is ensured by contact between the sealing ring and the bulges of the two tubes connected together and tightened by means of the tightening device. When this device is equipped with two first tightening lugs and two second tightening lugs, the tightening forces applied to the different lugs can be dissociated due to the presence of circumferential slits.

The present disclosure shall be understood and its advantages will become more apparent upon reading the following detailed description, of an embodiment represented by way of non limiting example. The description refers to the accompanying drawings.

BRIEF DESCRIPTION OF THE ACCOMPANYING DRAWINGS

DESCRIPTION OF THE EMBODIMENTS

Figure 1:
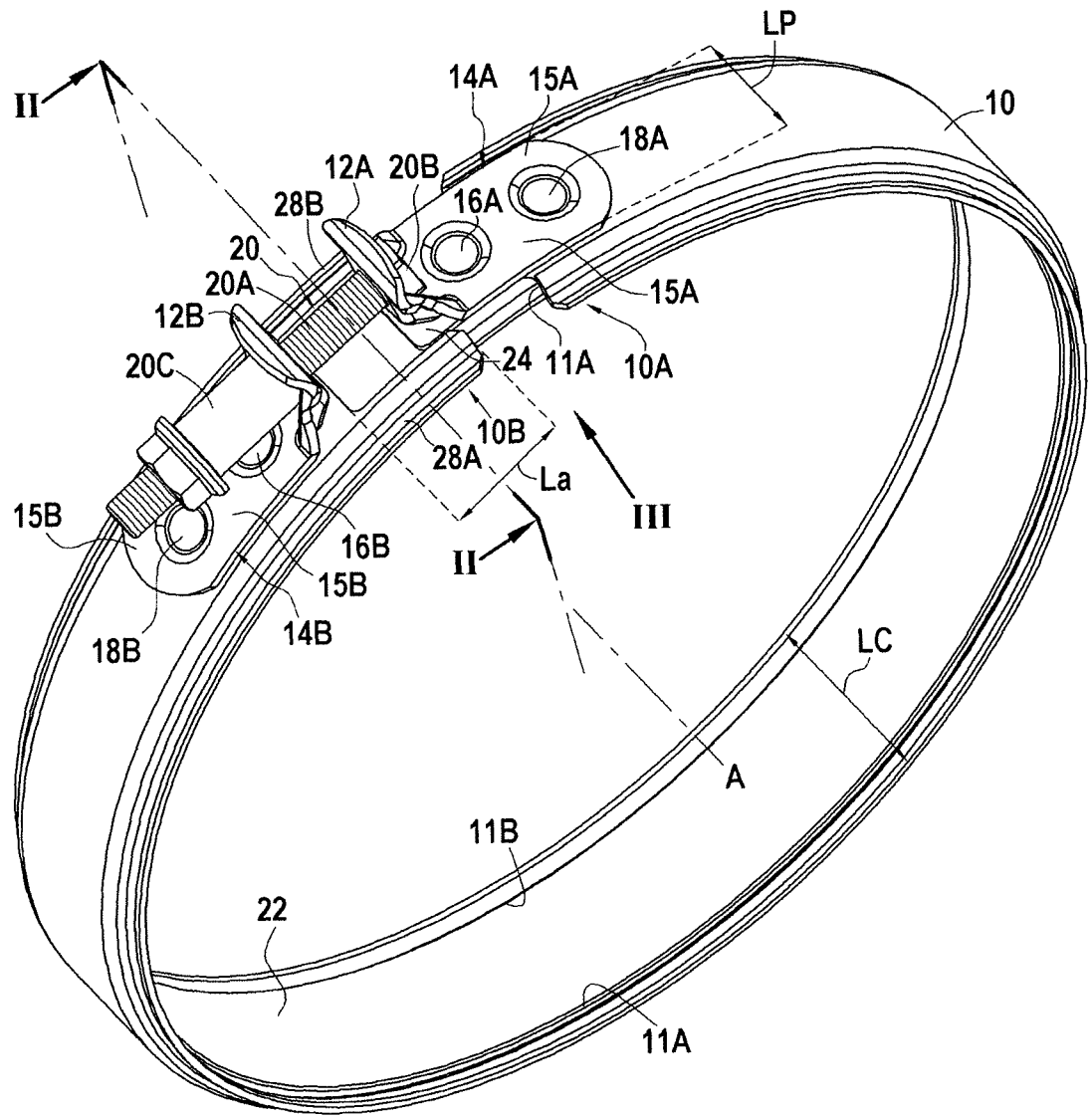
FIG. 1 is a perspective view of a tightening device according to the invention.

The tightening device shown on FIG. 1 comprises a belt 10 having a first and a second end, respectively 10A and 10B. This belt bears a first and a second tightening lug, respectively 12A and 12B, respectively located in the vicinity of the first and second end 10A and 10B. In this instance, the tightening lugs 12A and 12B are formed in strip portions 14A and 14B, that are added on the belt. In this instance, each lug is integral with the strip portion that bears it, this strip portion exhibiting a plate part, respectively 15A and 15B which is disposed against the radially external face of the belt 10 and oriented substantially according to the circumferential direction of this belt, and a lifted up portion that forms the lug, respectively 12A and 12B.

In this instance, each strip portion 14A and 14B is fastened to the belt by two fastening areas respectively 16A, 18A and 16B, 18B of which at least one, for example the second fastening area 18A, 18B is formed on a boss. The first fastening area, 16A and 16B, can also be formed on a boss and be carried out by welding. It can also be formed differently, for example by clinching or in the form of a centering stud which cooperates with an opening of the belt. In the example represented, each of the two fastening areas of each strip portion is formed by a boss, achieved in the plate of the strip portion considered and protruding towards the belt. It can be provided a reverse disposition, the boss being carried out in the belt and protruding towards the plate of the strip portion, or a mixed configuration, with a boss in the plate of the strip portion and the other in the belt.

However, there could be provided other fastening modes of the strip portions bearing the lugs without departing from the scope of the present disclosure. There could also be provided that the lugs be formed integral with the belt.

Whatever, it is understood that the lugs can be displaced with respect to each other to tighten the belt. In the represented example, this tightening is operated by making the lugs come closer together by means of a tightening stem that cooperates with them. In this instance, this tightening stem is formed by the stem 20A of a screw 20 of which the head 20B (or a nut cooperating with the stem) is retained behind one of the lugs, whereas a nut 20C cooperating with the stem 20A is retained behind the other lug. In this instance, the stem crosses the piercings of the lugs.

Figure 2:
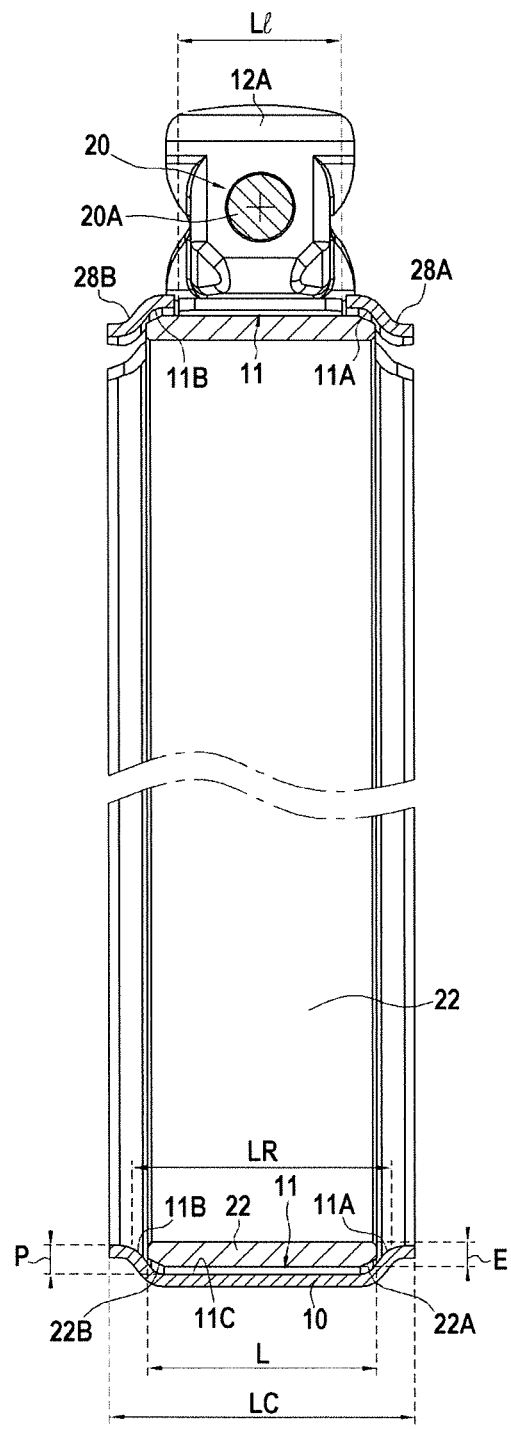
FIG. 2 is a sectional view in the plane II-II of FIG. 1.
Figure 3:
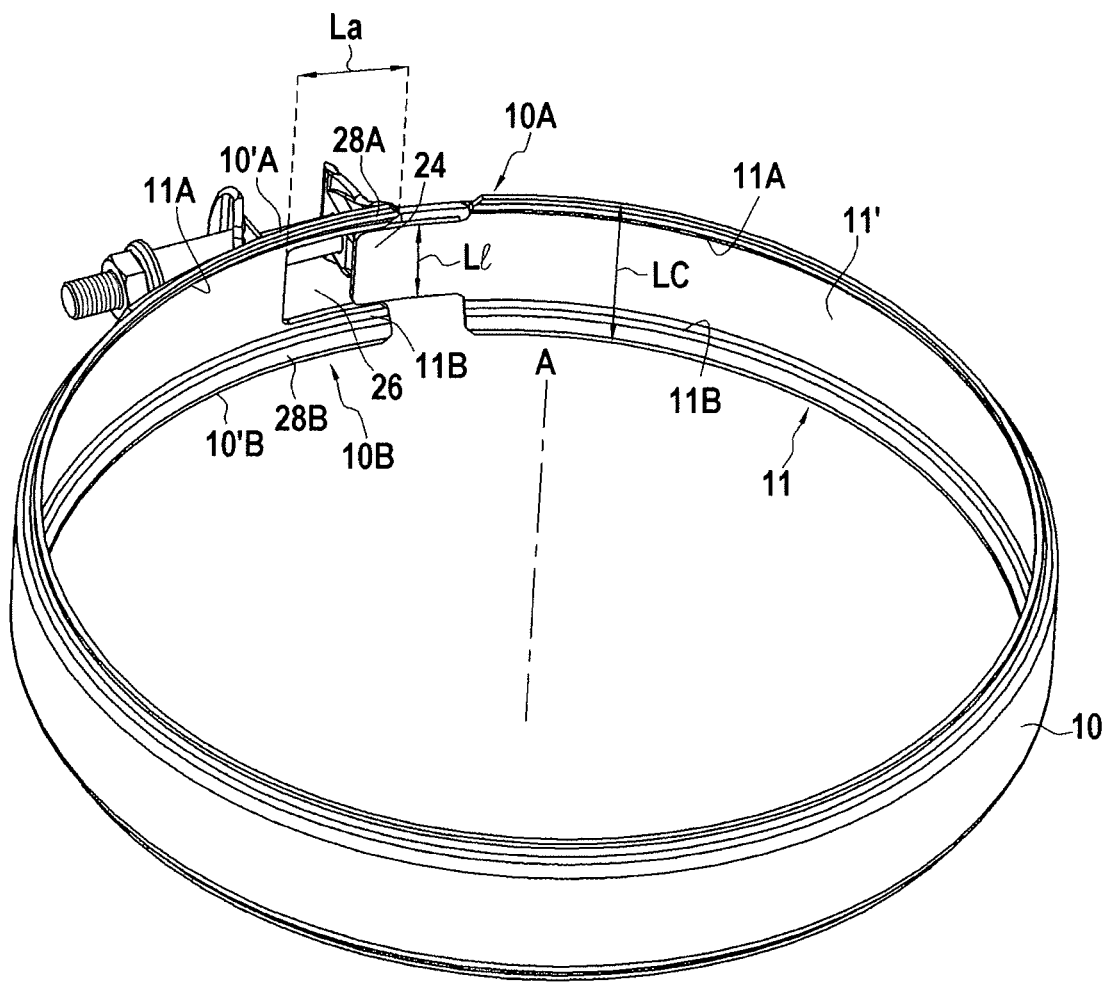
FIG. 3 is a perspective view of the device on FIG. 1 without the sealing ring, in a view taken globally according to the arrow III of FIG. 1.

As it can be better seen on FIGS. 2 and 3, the belt exhibits an annular recess 11 formed on its radially inner face.

As is standard, it shall be defined by "radially internal" the elements that are disposed towards the axis A of the belt by opposition to the radially external elements that are far off from this axis. Also as is standard, it shall be considered that the forward direction is that of the displacement of a lug during tightening. Thus, in this instance, in as far as the lugs are made closer to each other to achieve the tightening, the front side of a lug is that which is turned towards the other lug, whereas the back side is the opposite side.

The annular edges of the recess form wedging steps, respectively 11A and 11B. A sealing ring 22 (omitted on FIG. 3 for the clarity of the drawing) is disposed in the recess 11. This sealing ring is formed from a flat strip wound around itself. The ring can be closed or open.

In this instance, the recess 11 exhibits a flat bottom 11' that extends from one wedging step to the other 11A and 11B. The depth P of the recess substantially corresponds to the thickness E of the sealing ring 22. The depth P of the recess 11 is delimited between the cylindrical bottom of the latter and a cylindrical surface tangent to the radially internal surface of the belt 10 on the edges of the latter, on either side of the recess. Thus, the sealing ring is received in the recess by being wedged in the latter. It can be seen on FIG. 2 that the width L of the sealing ring measured between its two annular rims located in radial planes corresponds to the width LR of the recess. More precisely, the width LR is equal to the width L or very slightly greater than the latter. Thus, the sealing ring is not only housed in its thickness in the recess, but also wedged laterally between the two steps 11A and 11B. As it can be seen on FIG. 2, the annular edges of the sealing ring 22, particularly its external edges, can be slightly beveled or dulled to adapt to the transition between the wedging steps 11A and 11B and the recess 11 bottom 11C.

The sealing ring is particularly in a graphite type or graphite-based material, but it can also consist of a micabased material, or made from ceramic fibers or glass fibers, or generally of a composite material suitable for ensuring sealing particularly by compression or deformation.

The first end 10A of the belt 10 exhibits a male sealing arrangement, in this instance a central tab 24, whereas its second end 10B exhibits a central notch 26 forming a female sealing arrangement. It is understood that the central tab 24 penetrates into the central notch 26 during the tightening of the belt. This central notch 26 is delimited between lateral tabs, respectively 28A and 28B. The tab 28A extends, in the belt widthwise, that is to say, parallel to the axis A of the latter, from the annular edge 10'A of this belt to the recess 11.

Likewise, the tab 28B extends from the annular edge 10'B opposite the belt to the recess 11. Thus, each lateral tab 28A and 28B comprises a part of one of the wedging steps. Thus, on FIGS. 2 and 3, it can be seen that the wedging step 11A extends in the tab 28A, in this instance over the entire length of this tab, and that, similarly, the wedging step 11B extends in the tab 28B over the length of this tab.

As it can be seen particularly on FIG. 2, the sealing ring 22 is thus also wedged laterally in the region of the tabs 28A and 28B. This sealing ring is thus protected on its edges as well as being protected by the central tab 24 on its radially external face.

During the tightening of the belt, its two ends 10A and 10B become closer to each other by thereby compressing the sealing ring 22. The wedging of this sealing ring in the region of the lateral tabs contributes to this compression and to its homogeneity, while avoiding the use or damage to the sealing ring in this area which is particularly subject to leakage risks.

As indicated, the sealing ring can be a closed annulus. If it has the form of an open annulus, the parting line between the ends of this annulus can be disposed at a distance from the belt ends.

Figure 4:
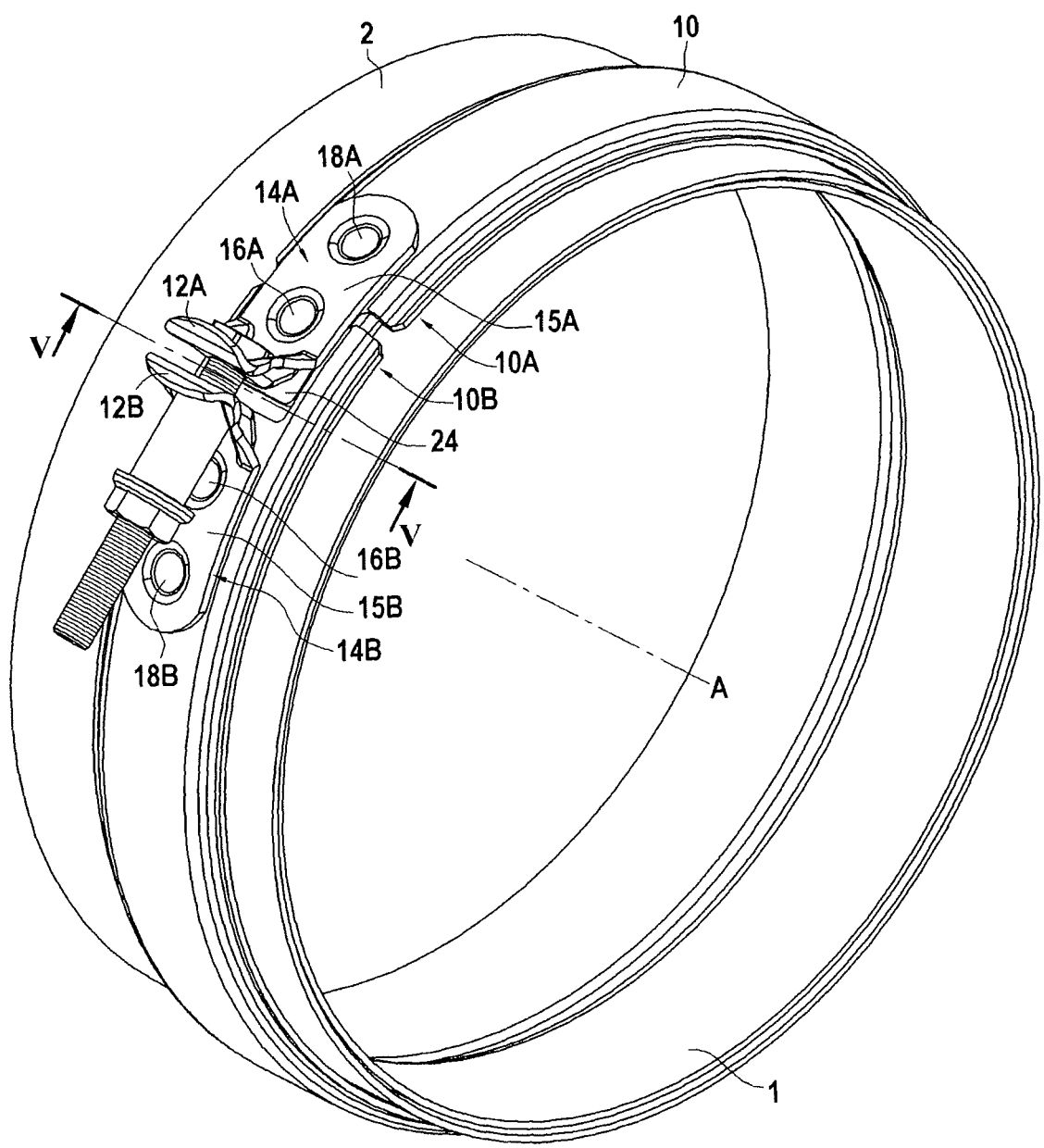
FIG. 4 shows a perspective of the device of FIGS. 1 to 3 tightened over two tubes.

FIG. 4 shows the tightening device in the tightened state on two tubes 1 and 2 connected inside this device. It can be seen that, in this tightened state, a very low portion of the length of the sealing ring is exposed laterally, at the free end of the lateral tabs 28A and 28B.

Figure 5:
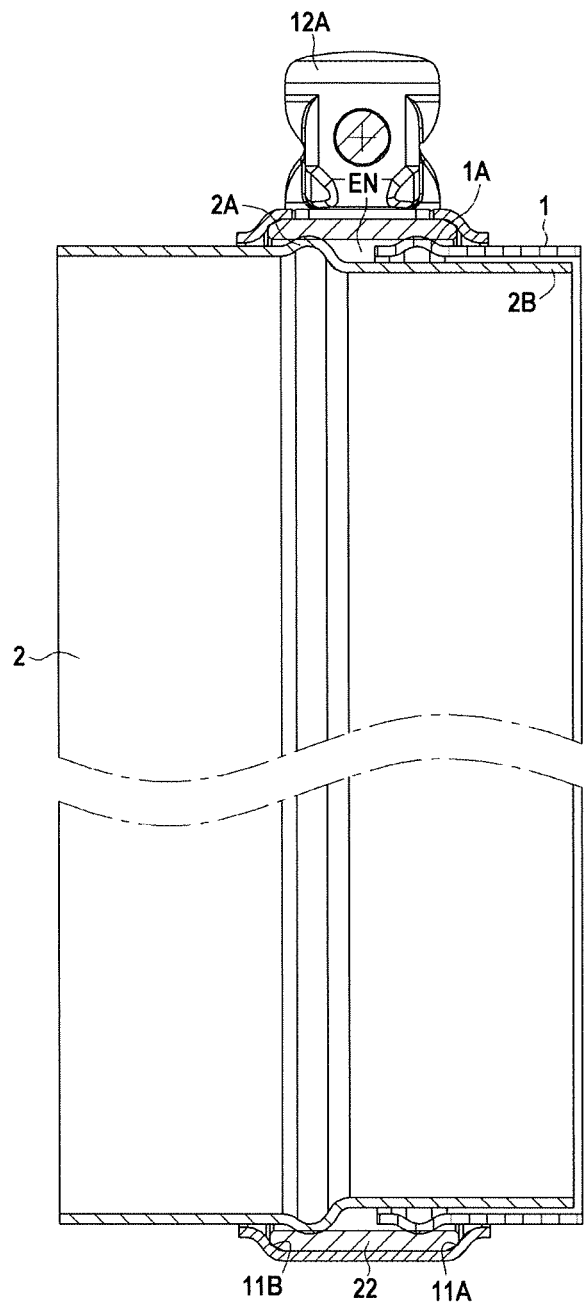
FIG. 5 is a sectional view in the plane V-V of FIG. 4.

As it can be better seen on FIG. 5, the tubes 1 and 2 each exhibit in this instance an annular bulge, 2A for the tube 2 and 1A for the tube 1. In this instance, the tube 2 exhibits a free end 2B press-fitted in the tube 1. In this press-fitted state, the two annular bulges 1A and 2A are topped by the tightening device and, more particularly, by the sealing ring 22. The enclosure EN thus formed between the bulges 1A and 2A of the tubes and the sealing ring 22 is thus closed with respect to the outside.

In the represented example, the width LR of the recess represents in this instance at least 60%, preferably at least 70%, or even 80% of the width LC of the belt, measured from one annular edge to the next of the latter.

In reference to the figures that have been described, it can also be seen that, in the represented example, the strip portions 14A and 14B in which the tightening lugs are formed, have a width LP that is slightly lower than the width LR of the recess 11. These strip portions 14A and 14B, more precisely their plates 15A and 15B are fastened on the radially external face of the recess 11. In this instance, the strip portion 14A in which the first lug 12A is formed, is fastened to the belt 10 in the region of the central tab 24. It can be seen that the first fastening area 16A of this strip portion 14A is located on the central tab 24. In this instance, the width LP of the plate 15A is similar to the width L1 of this central tab 24. This fastening on the central tab allows promoting the radial bearing of this tab on the sealing ring during tightening. However, it can be seen that the second fastening area 18A is located to the rear of the central tab 24. More precisely, in the tightened state of the collar visible on FIG. 4, the ends of the lateral tabs 28A and 28B are located at the front of this fastening area 18A. In other words, the second fastening area 18A is found, in the tightened state, beyond the ends of the lateral tabs 28A and 28B in the direction going from, following the circumference of the belt 10, from its first end 10A towards its second end 10B, without passing by the parting line between these two ends.

In the embodiment that has been described, the device includes one single first lug 12A and one single second lug 12B.

It shall now be described, FIG. 6 and its following figures show an alternative in which the device comprises two first lugs and two second lugs. On these figures, the unchanged elements with respect to the previous figures are designated by the same references. It can be seen that the device comprises two first lugs, respectively 12A and 12'A, disposed side by side widthwise on the belt at its first end 10A, and two second lugs, respectively 12B and 12'B disposed side by side at the second end 10B of the belt. In this instance, the lugs are formed like in the first embodiment, that is to say, in a strip portion fastened to the belt by its plate. One can for example identify on FIG. 6 the strip portion 14A in which the first lug 12A is formed, the plate 15A of that strip portion being fastened at the radially external face of the belt, and the strip portion 14'A, in which the other lug 12'A is formed and of which the plate 15'A is fastened to the belt. The first two lugs are identical, such as the two second lugs.

The plates 15A and 15'A are disposed side by side widthwise and each exhibits a width that is substantially equal to half the width LC of the belt. Thus, the first two lugs are disposed on two distinct portions of the belt width and the second two lugs are disposed on two distinct portions of the belt width.

Figure 8:
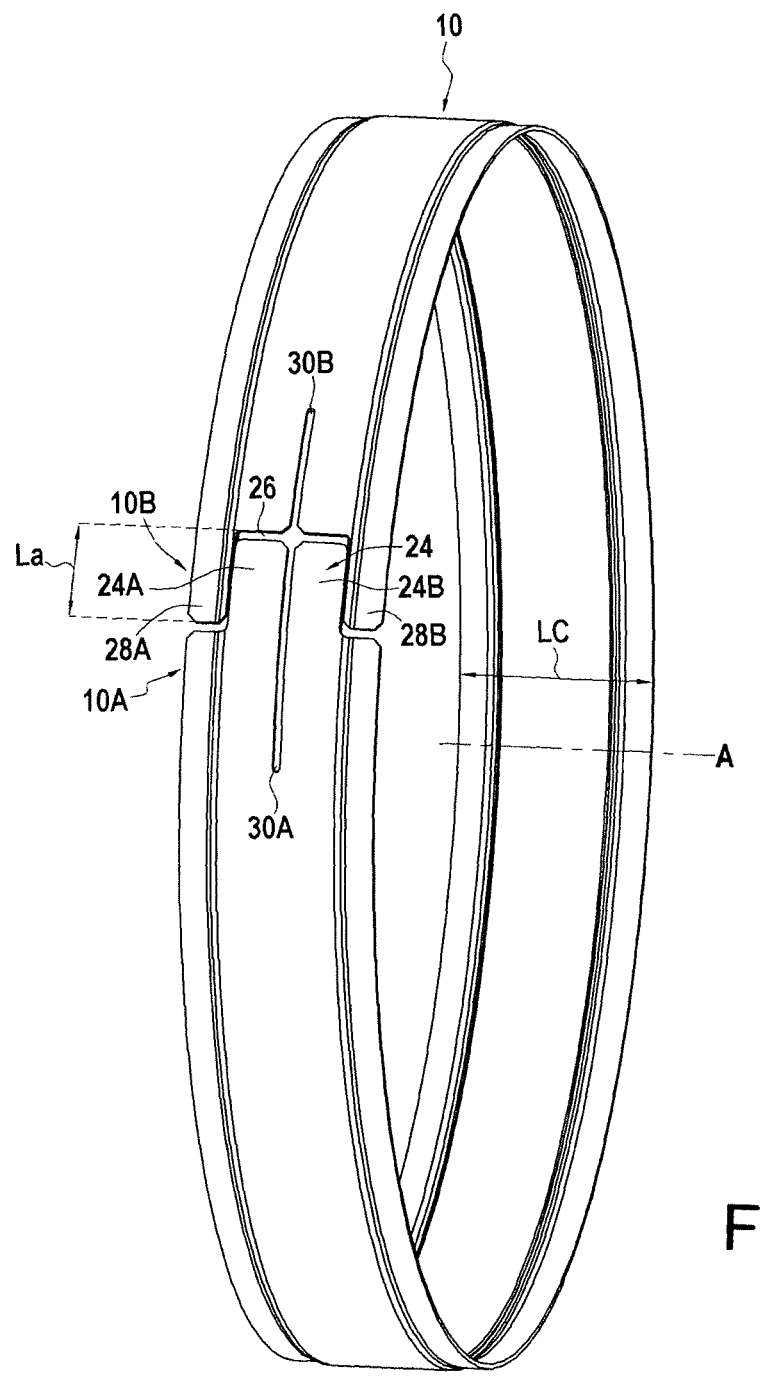
FIG. 8 is a view similar to FIG. 6, showing the device without the tightening lugs thereof.

By referring in particular to FIG. 8, it can be seen that the respective distinct portions are separated by the circumferential slits. Thus, the first end 10A of the belt exhibits a circumferential slit 30A which extends rearwards from the free end of this first end, over a length that is substantially equal to that of the plates 15A and 15'A of the strip portions 14A and 14'A which bear the first lugs 12A and 12'A. Thus, the circumferential slit 30A divides the central tab 24 into two tab portions 24A and 24B. Similarly, the second end 10B of the belt exhibits a circumferential slit 30B which extends from its free end over a length substantially equal to that of the plates 15B and 15'B of the strip portions 14B and 14'B in which the second lugs 12B and 12'B are formed.

The circumferential slits 30A and 30B are disposed towards the middle of the belt width. Consequently, the circumferential slit 30B starts from the bottom of the central notch 26 and extends towards the rear as stated. The lengths of the slits 30A and 30B can be substantially equal. However, in the example represented, the slit 30A is longer than the slit 30B. In this instance, the lengths of the slits are such that these slits do not surpass or hardly surpass at the rear of the plates of the strip portions in which the lugs are formed.

Figure 7:
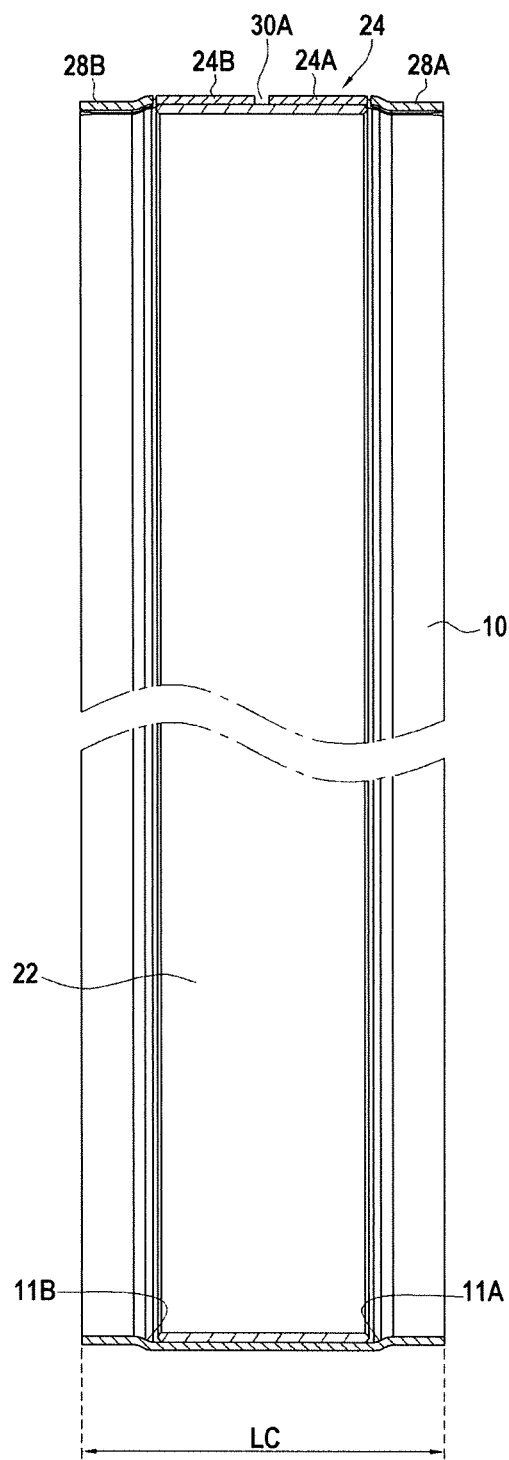
FIG. 7 is a sectional view according to plane VII-VII of FIG. 6.
Figure 9:
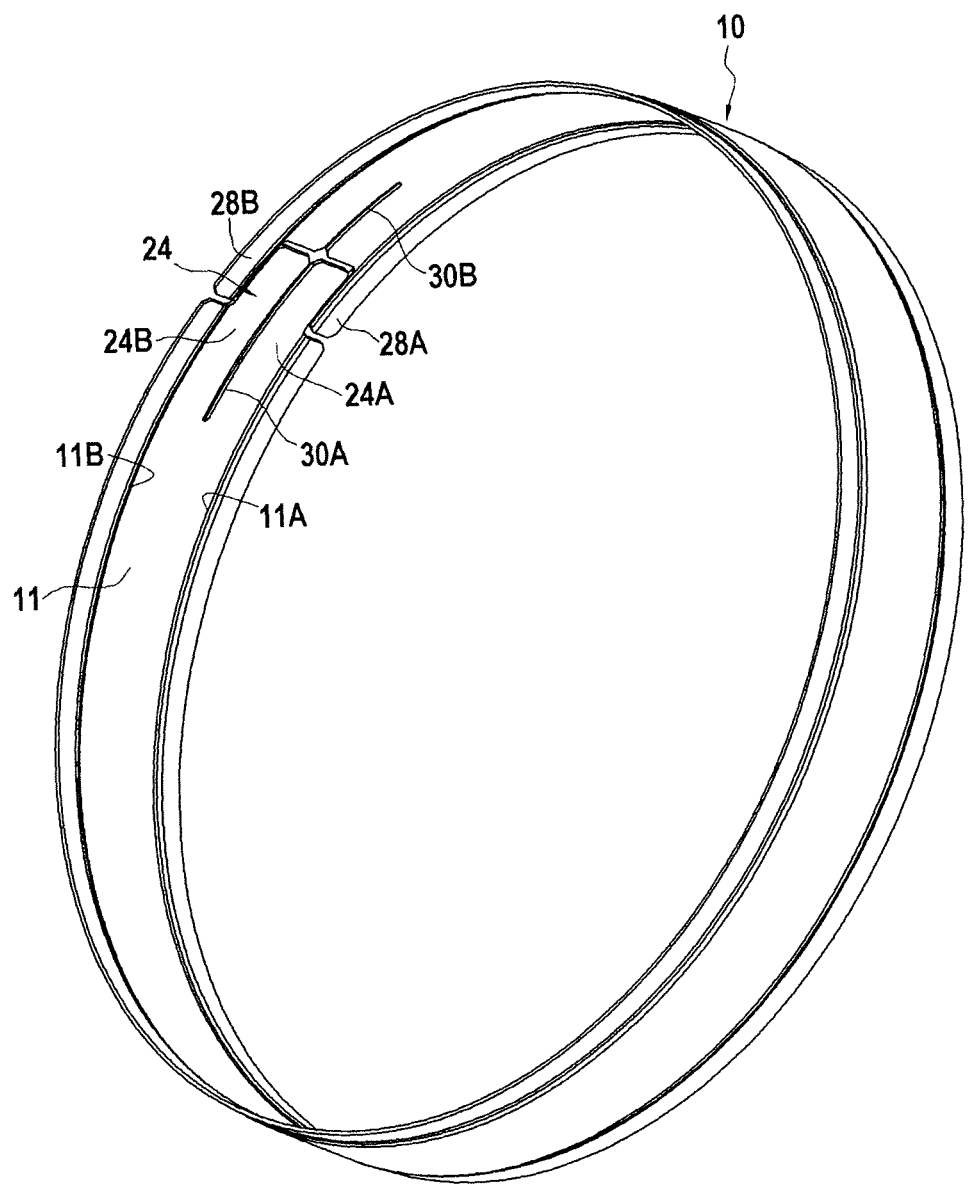
FIG. 9 is a perspective view showing the inside of the device without the tightening ring, globally taken according to the arrow IX of FIG. 6.

Apart from the presence of the lugs 30A and 30B, the belt is similar to that of the embodiment of the previous figures. Particularly, it presents the aforementioned recess 11. On FIG. 7, it can be seen that the sealing ring 22 is received in this recess by being laterally wedged by the steps 11A and 11B, better visible on FIG. 9.

Figure 6:
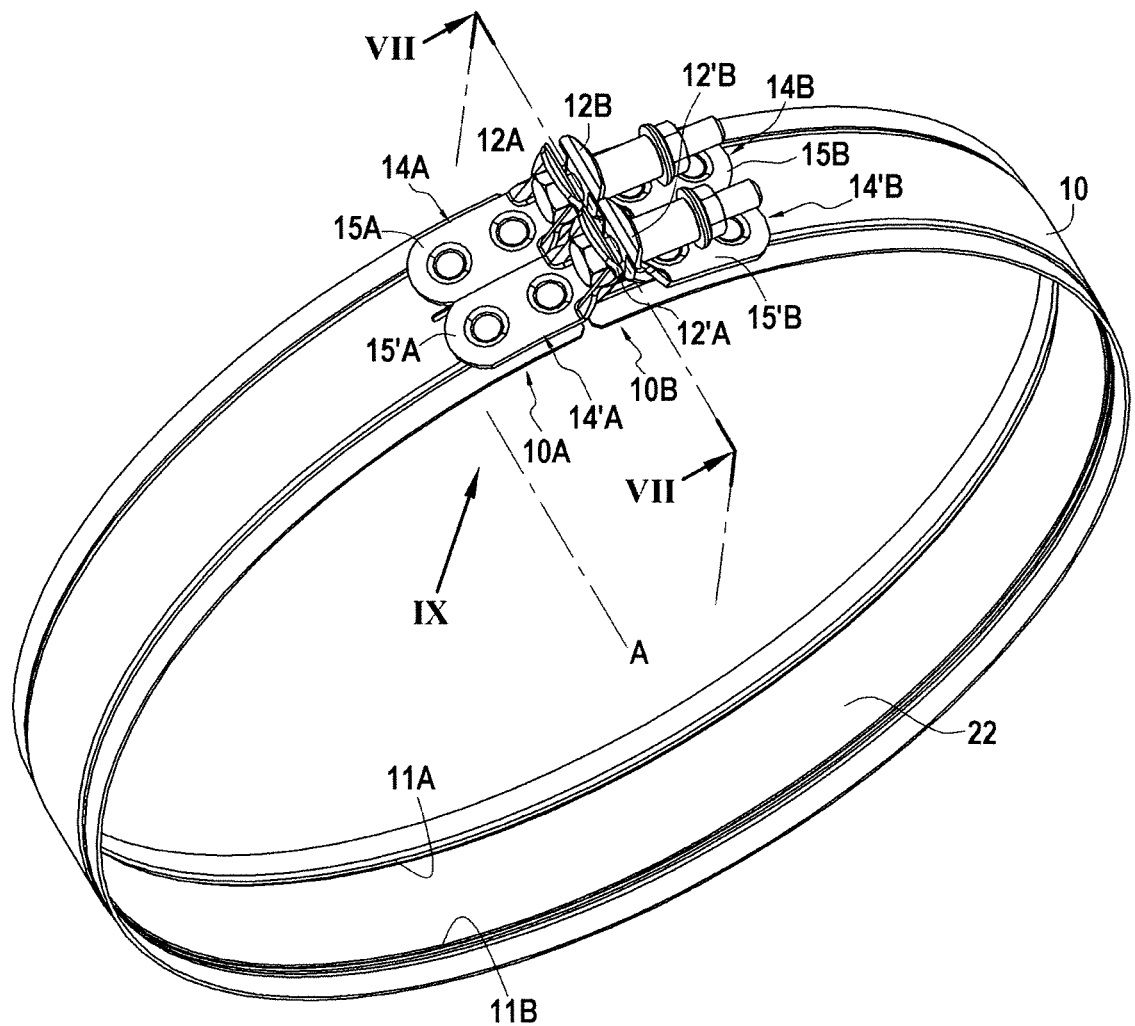
FIG. 6 is a view similar to FIG. 1 showing another embodiment.
Figure 10:
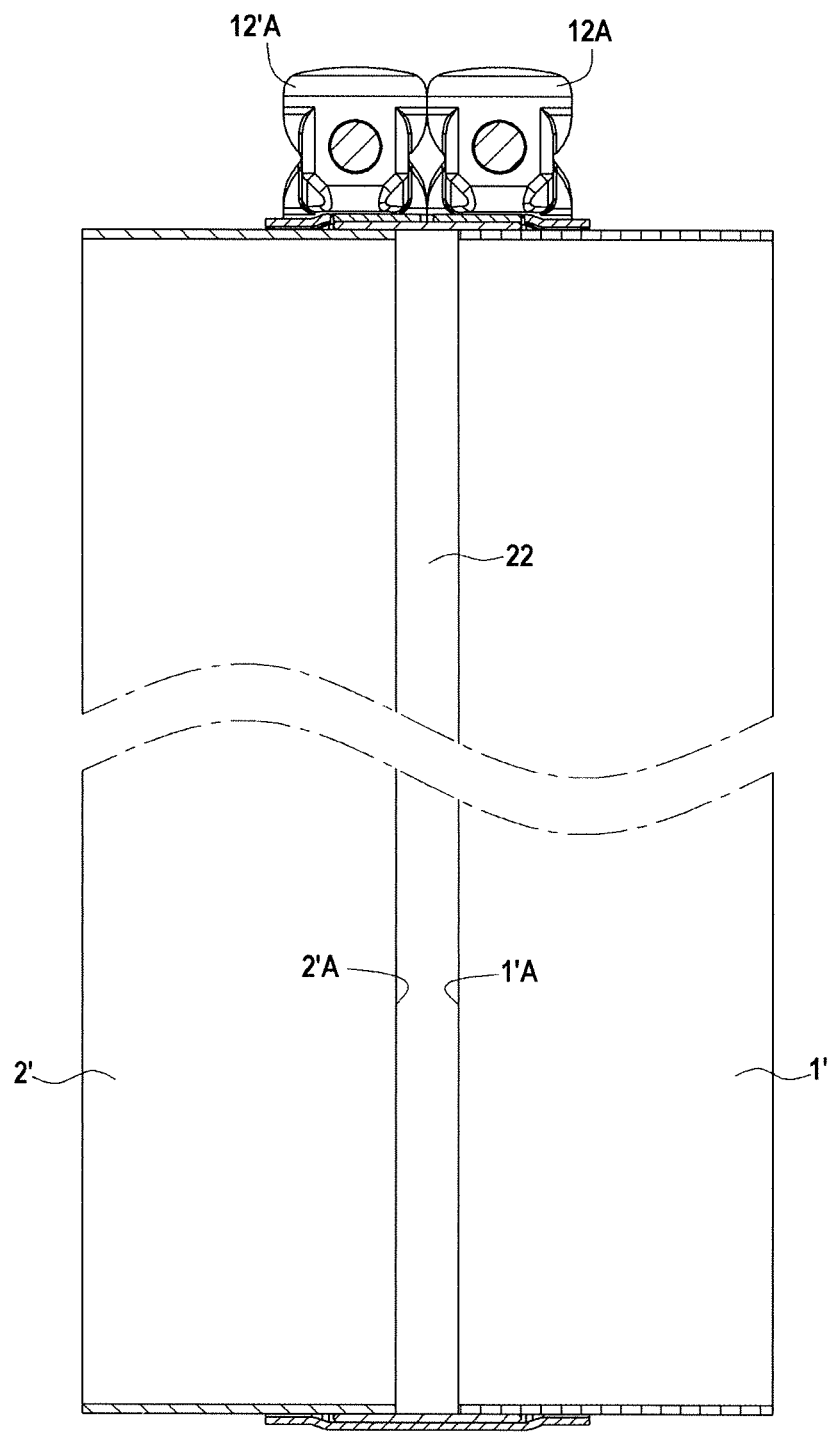
FIG. 10 is a sectional view in a plane parallel to the axis of the belt and comprising a diameter of the latter, showing the device tightened on the ends of the two tubes.

FIG. 10 shows the tightening device of FIG. 6 disposed at the ends of two tubes 1' and 2' that this device serves to connect. In this instance, it can be seen that these tubes are smooth, their ends free, respectively 1'A and 2'A facing each other by being disposed end to end, in a joined manner or not. In this instance, for the sake of clarity of this drawing, these ends are represented as non joined. It can be seen that the sealing ring 22 covers the parting line between these two free ends. It can also be seen that the first lug 12A is located radially above the tube 1', whereas the first lug 12'A is located radially above the tube 2'. Likewise, the second lugs 12B and 12B' are respectively located radially above the tube 1' and the tube 2', the lugs 12A and 12B being aligned in the circumferential direction, just like the lugs 12'A and 12'B. Due to the presence of circumferential slits 30A and 30B, the portions of the belt on which are located, on the one hand, the lugs 12A and 12B and, on the other hand, the lugs 12'A and 12'B, can act slightly differently during the tightening. Thereby, it is ensured that the belt is perfectly tightened on each of the two tubes although the diameters thereof are ever so slightly different or if the displacements of the lugs of each pair are not strictly synchronised.

In the aforementioned examples, the central tab 24 has a width that is substantially constant over its entire length. In fact, the lateral edges of this tab are parallel to the circumferential direction of the belt, which corresponds to the direction of the strip length in which this belt is formed. Likewise, the lateral tabs 28A and 28B are also parallel to this direction, particularly as regards their inner edges between which the central tab is housed.

Figure 11:
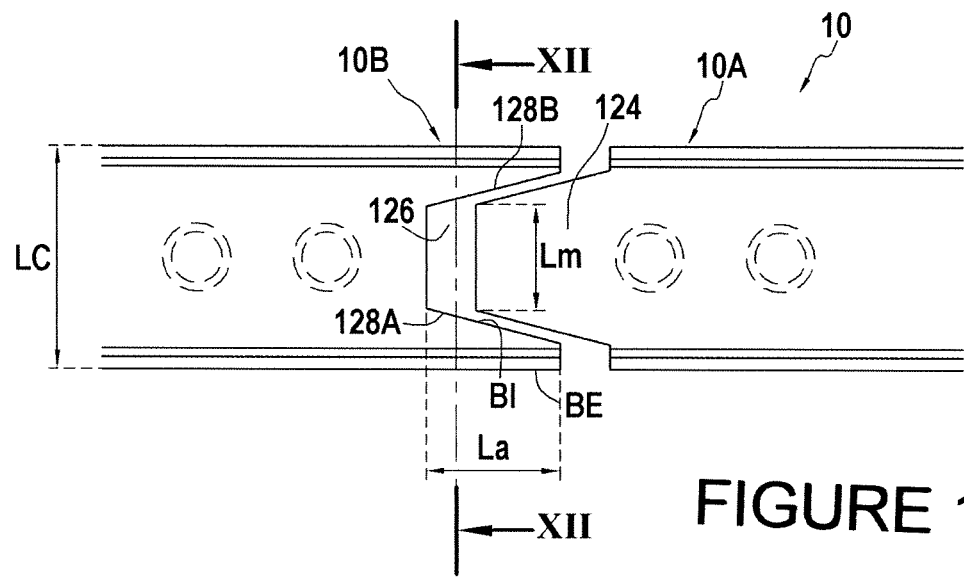
FIG. 11 is a top view showing a part of the radially external face of a belt according to an alternative, in the region of its ends.
Figure 12:
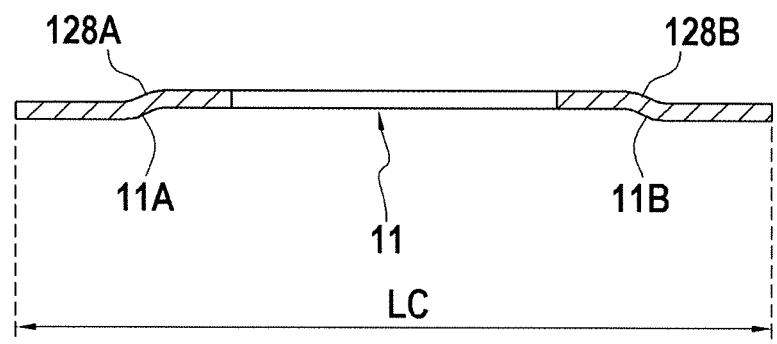
FIG. 12 is a section according to the line XII-XII of FIG. 11.

FIGS. 11 and 12 show an alternative. On these figures, the unchanged elements with respect to the previous figures are designated by the same references. Thus, the belt 10 presents an annular recess 11 as on the previous figures. The central tab 124 disposed at the first end 10A of the belt has a width which gradually decreases towards its free end, to a minimum width Lm. Seen from above, this central tab thus defines a substantially trapezoidal form. The central notch 126 has a shape adapted to that of the central tab 124 and hence a width that diminishes until it reaches the bottom thereof. The lateral tabs 128A and 128B thus present outer edges BE that are parallel to the circumferential direction of the belt, but internal edges BI that are slanted with respect to this direction. It is worth noting however that, particularly in the section of FIG. 12, the recess 11 partly extends in these lateral tabs 128A and 128B in such a way that each of these lateral tabs comprises a part of one of the steps 11A and 11B.

The width L1 of the central tab 24 is also its minimum width considering that the edges of this tab are parallel. Thus, generally, the minimum width L1 of the tab 24 or Lm of the tab 124 can represent at least 50%, preferably at least 60% even 70% of the width LC of the belt.

As it can be seen in particular on FIGS. 3 and 11, the length La of the lateral tabs 28A and 28B or 128A and 128B, measured from the bottom of the recess 26 or 126 to the free end of these tabs, according to the circumferential direction of the belt, ranging between 50% and 150%, optionally between 70% and 120% of the width LC of the belt. This allows, on the one hand, ensuring a good contact surface between the inner edges of the lateral tabs and the mating edges of the male sealing arrangement, in this instance the central tab 24 or 124, allowing obtaining a good sealing capacity according to the belt specifications. On the other hand, the lateral tabs thus, have a sufficient length to fully protect the edges of the sealing ring. The length of the central tab is substantially equal to that of the lateral tabs.

The invention claimed is:

1. A tightening device comprising a belt having a first and a second end, a sealing ring disposed in an annular recess of the belt, and a first and a second tightening lug born by the belt, respectively in the vicinity of the first and the second end of the belt, the tightening lugs being able to be displaced with respect to each other to tighten the belt, wherein the tightening lugs are formed in strip portions added onto the belt, the recess having edges that form wedging steps for the edges of the sealing ring, the latter substantially occupying the entire width of the recess between said steps, the first and second ends of the belt having a sealing arrangement which comprises two lateral tabs formed at the second end, each of these lateral tabs extending, widthwise on the belt, from one edge of the belt to the recess, in such a way that each lateral tab comprises a part of one of the wedging steps.

2. The device according to claim 1, wherein the sealing arrangement is a male/female type arrangement, the first end of the belt presenting a male arrangement that penetrates between the lateral tabs of the second end in the tightened state of the belt.

3. The device according to claim 2, wherein the sealing arrangement comprises a central tab formed at the first end of the belt and a central notch formed at the second end of the belt and delimited by the lateral tabs, the central tab penetrating in the central notch in the tightened state of the belt.

4. The device according to claim 3, wherein the first tightening lug is formed in a strip portion added onto the belt and fastened to the belt in at least one first fastening area which is located on the central tab.

5. The device according to claim 4, wherein the strip portion in which the first lug is formed is further fastened to the belt in at least a second fastening area which, in the tightened state of the belt, extends beyond the ends of the lateral tabs in the direction going from the first end towards the second end of the belt, following the circumference of the belt.

6. The device according to claim 1, wherein the recess has a flat bottom that extends from one wedging step to the other.

7. The device according to claim 1, in which the strip portions in which the tightening lugs are formed, have a width lower than or equal to the width of the recess and are fastened on the radially external face of the recess.

8. The device according to claim 1, wherein the width of the recess represents at least 60% of the width of the belt.

9. The device according to claim 1, wherein the width of the recess represents at least 70% of the width of the belt.

10. The device according to claim 1, wherein the sealing arrangement comprises a central tab formed at the first end of the belt and a central notch formed at the second end of the belt and delimited by the lateral tabs, the central tab penetrating in the central notch in the tightened state of the belt, and wherein a minimum width of the central tab represents at least 50% of the width of the belt.

11. The device according to claim 10, wherein a minimum width of the central tab represents at least 60% of the width of the belt.

12. The device according to claim 1, wherein the lateral tabs have a length ranging between 50% and 150% of the width of the belt.

13. The device according to claim 1, wherein the lateral tabs have a length between 70% and 120% of the width of the belt.

14. The device according to claim 1, comprising two first tightening lugs disposed in the vicinity of the first end of the belt on two distinct portions of the belt width, and two second tightening lugs disposed in the vicinity of the second end of the belt on two distinct portions of the belt width.

15. The device according to claim 14, wherein the distinct portions of the belt width on which the two first lugs and/or the two second lugs are disposed, are separated by a circumferential slit of the belt.

16. The device according to claim 1, comprising a tightening stem, retained with respect to the two lugs.

17. The device according to claim 1, wherein each lateral tab comprises a part of one of the wedging steps that extends over the entire length of the tab.

* * * * *